(12) United States Patent
de Oliveira et al.

(10) Patent No.: US 11,941,348 B2
(45) Date of Patent: *Mar. 26, 2024

(54) LANGUAGE MODEL FOR ABSTRACTIVE SUMMARIZATION

(71) Applicant: Twilio Inc., San Francisco, CA (US)

(72) Inventors: Luke Percival de Oliveira, San Francisco, CA (US); Alfredo Láinez Rodrigo, Madrid (ES)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,176

(22) Filed: Sep. 7, 2022

(65) Prior Publication Data

US 2022/0414319 A1  Dec. 29, 2022

Related U.S. Application Data

(63) Continuation of application No. 17/304,081, filed on Jun. 14, 2021, now Pat. No. 11,475,210.

(Continued)

(51) Int. Cl.
*G06N 3/04* (2023.01)
*G06F 40/166* (2020.01)
(Continued)

(52) U.S. Cl.
CPC .......... *G06F 40/166* (2020.01); *G06F 40/284* (2020.01); *G06N 3/04* (2013.01); *G06N 3/08* (2013.01); *H04M 3/5183* (2013.01)

(58) Field of Classification Search
CPC ...... G06F 40/166; G06F 40/284; G06F 40/35; G06F 16/345; G06N 3/04; G06N 3/08;
(Continued)

(56) References Cited

U.S. PATENT DOCUMENTS 5,384,703 A * 1/1995 Withgott ............... G06F 16/345
715/236
6,567,805 B1  5/2003 Johnson et al.
(Continued)

FOREIGN PATENT DOCUMENTS

WO  2022086939  4/2022

OTHER PUBLICATIONS

"U.S. Appl. No. 17/447,039, Final Office Action dated Feb. 21, 2023", 11 pgs.

(Continued)

*Primary Examiner* — Hassan Mrabi
(74) *Attorney, Agent, or Firm* — Schwegman Lundberg & Woessner, P.A.

(57) ABSTRACT

Methods, systems, and computer programs are presented for abstractive summarization of text by viewing sequence transduction as a language modeling problem. One method comprises an operation for training a machine-learning program to create a machine-learning model that estimates a word to be added to a running summary for the text being summarized. The method further comprises operations for detecting the text to be summarized, initializing the running summary, and performing a plurality of iterations. Each iteration comprises providing, to the machine-learning model, the source text and the running summary, and adding, using the machine-learning model, a new word to the running summary. Further, the method comprises an operation for storing, on a memory, the running summary as the summary of the text.

20 Claims, 7 Drawing Sheets

Related U.S. Application Data

(60) Provisional application No. 63/072,538, filed on Aug. 31, 2020.

(51) Int. Cl.
    *G06F 40/284*     (2020.01)
    *G06N 3/08*     (2023.01)
    *H04M 3/51*     (2006.01)

(58) Field of Classification Search
    CPC ............... G06N 3/045; H04M 3/5183; H04M 2203/2061
    See application file for complete search history.

(56) References Cited

U.S. PATENT DOCUMENTS

| | | | |
|---|---|---|---|
| 7,801,910 | B2 | 9/2010 | Houh et al. |
| 8,494,133 | B2 | 7/2013 | Jeffs et al. |
| 8,775,165 | B1 | 7/2014 | Oikawa |
| 8,798,242 | B1 | 8/2014 | Sankaranarayanan |
| 8,942,359 | B2 | 1/2015 | Seetharaman et al. |
| 9,880,807 | B1 | 1/2018 | Haggerty et al. |
| 9,910,909 | B2 | 3/2018 | Hegde et al. |
| 9,965,726 | B1 | 5/2018 | Tablan et al. |
| 10,089,639 | B2 | 10/2018 | Kannan et al. |
| 10,467,339 | B1 | 11/2019 | Shen |
| 10,839,335 | B2 | 11/2020 | Weisman et al. |
| 11,165,900 | B2 | 11/2021 | Sachdev |
| 11,170,175 | B1 | 11/2021 | Kohli et al. |
| 11,475,210 | B2 | 10/2022 | De Oliveira et al. |
| 11,765,267 | B2 | 9/2023 | Cole et al. |
| 2002/0046018 | A1* | 4/2002 | Marcu ..................... G06F 40/44 704/9 |
| 2009/0030894 | A1 | 1/2009 | Mamou et al. |
| 2010/0104086 | A1 | 4/2010 | Park |
| 2015/0032448 | A1 | 1/2015 | Wasserblat et al. |
| 2015/0046783 | A1 | 2/2015 | O'donoghue et al. |
| 2015/0106091 | A1 | 4/2015 | Wetjen et al. |
| 2015/0181020 | A1 | 6/2015 | Fitzsimmons et al. |
| 2015/0256677 | A1 | 9/2015 | Konig et al. |
| 2018/0113854 | A1 | 4/2018 | Vig et al. |
| 2019/0392837 | A1 | 12/2019 | Jung et al. |
| 2020/0279017 | A1* | 9/2020 | Norton ................... G06N 3/045 |
| 2021/0158805 | A1 | 5/2021 | Sivasubramanian et al. |
| 2022/0067269 | A1 | 3/2022 | De Oliveira et al. |
| 2022/0156296 | A1 | 5/2022 | De Oliveira et al. |
| 2022/0156460 | A1 | 5/2022 | Láinez Rodrigo et al. |
| 2022/0210268 | A1 | 6/2022 | Cole et al. |
| 2022/0382959 | A1 | 12/2022 | Láinez Rodrigo et al. |

OTHER PUBLICATIONS

"U.S. Appl. No. 17/447,039, Response filed Apr. 21, 2023 to Final Office Action dated Feb. 21, 2023", 11 pgs.
"U.S. Appl. No. 17/447,039, Notice of Allowance dated May 12, 2023", 11 pgs.
"U.S. Appl. No. 17/304,081, Notice of Allowance dated Jun. 9, 2022", 9 pgs.
"U.S. Appl. No. 17/304,081, Notice of Allowability dated Jul. 20, 2022", 2 pgs.
"U.S. Appl. No. 17/447,039, Non Final Office Action dated Aug. 16, 2022", 10 pgs.
"U.S. Appl. No. 17/447,039, Examiner Interview Summary dated Nov. 7, 2022", 2 pgs.
"U.S. Appl. No. 17/447,039, Response filed Nov. 16, 2022 to Non Final Office Action dated Aug. 16, 2022", 11 pgs.
Ba, Jimmy Lei, "Layer Normalization", arXiv preprint, arXiv:1607.06450v1 [stat.ML], (Jul. 21, 2016), 14 pgs.
Celikyilmaz, Asli, "Deep Communicating Agents for Abstractive Summarization", arXiv preprint, arXiv:1803.10357v3 [cs.CL], (Aug. 15, 2018), 14 pgs.
Chopra, Sumit, "Abstractive Sentence Summarization with Attentive Recurrent Neural Networks", Proceedings of the NAACL-HLT16, (2016), 93-98.
Dai, "Semi-supervised Sequence Learning", arXiv preprint, arXiv:1511.01432 [cs.LG], (Nov. 4, 2015), 10 pgs.
Devlin, Jacob, "BERT: Pre-training of Deep Bidirectional Transformers for Language Understanding", arXiv preprint, arXiv:1810.04805 [cs.CL], (2018), 14 pgs.
Gehrmann, Sebastian, "Bottom-Up Abstractive Summarization", arXiv preprint, arXiv:1808.10792v2 [cs.CL], (Oct. 9, 2018), 12 pgs.
Gu, Jiatao, "Incorporating Copying Mechanism in Sequence-to-Sequence Learning", arXiv preprint, arXiv:1603.06393v3 [cs.CL], (Jun. 8, 2016), 10 pgs.
Holtzman, Ari, "The Curious Case of Neural Text Degeneration", 8th International Conference on Learning Representations (ICLR), (Apr. 2020), 16 pgs.
Howard, Jeremy, "Universal Language Model Fine-tuning for Text Classification", arXiv preprint, arXiv:1801.06146v5 [cs.CL], (May 23, 2018), 12 pgs.
Kingma, Diederik P, "Adam: A Method for Stochastic Optimization", arXiv preprint, arXiv:1412.6980v9 [cs.LG], (Jan. 30, 2017), 15 pgs.
Kudo, Taku, "SentencePiece: A simple and language independent subword tokenizer and detokenizer for Neural Text Processing", arXiv preprint, arXiv:1808.06226v1 [cs.CL], (Aug. 19, 2018), 6 pgs.
Li, Piji, "Actor-Critic based Training Framework for Abstractive Summarization", arXiv preprint, arXiv:1803.11070v2 [cs.CL], (Aug. 15, 2018), 10 pgs.
Lin, Chin-Yew, "Rouge: A Package for Automatic Evaluation of Summaries", Text Summarization Branches Out: Proceedings of the ACL-04 Workshop, Barcelona, Spain., (2004), 8 pgs.
Liu, Peter J, "Generating Wikipedia by Summarizing Long Sequences", arXiv preprint, arXiv:1801.10198v1 [cs.CL], (Jan. 30, 2018), 18 pgs.
Lloret, Elena, "The Challenging Task of Summary Evaluation: An Overview", Author preprint, Language Resources and Evaluation, 52:1, 101-148, (2017), 54 pages.
Nallapati, Ramesh, "Abstractive Text Summarization using Sequence-to-sequence RNNs and", arXiv preprint, arXiv:1602.06023v5 [cs.CL], (Aug. 26, 2016), 12 pgs.
Narayan, Shashi, "Don't Give Me the Details, Just the Summary.", arxiv prepint, arixiv 1808.08745v1 cs.cl, (Aug. 27, 2018), 11 pages.
Paulus, Romain, "A Deep Reinforced Model for Abstractive Summarization", arXiv:1705.04304v3 [cs.CL], (Nov. 13, 2017), 12 pgs.
Peters, Matthew, "Deep contextualized word representations", Proceedings of the 2018 Conference of the North American Chapter of the Association for Computational Linguistics: Human Language Technologies, vol. 1 Long Papers, (2018), 11 pgs.
Radford, Alec, "Improving Language Understanding Generative Pre-Training", author preprint, (2018), 12 pgs.
Radford, Alec, "Language Models are Unsupervised Multitask Learners", author preprint, (2018), 24 pgs.
Rush, Alexander M, "A Neural Attention Model for Abstractive Sentence Summarization", arXiv preprint, arXiv:1509.00685v2 [cs.CL], (Sep. 3, 2015), 11 pgs.
Schluter, Natalie, "The limits of automatic summarisation according to ROUGE", Proceedings of the 15th Conference of the European Chapter of the Association for Computational Linguistics: vol. 2, Short Papers, (Apr. 3-7, 2017), 5 pgs.
See, Abigail, "Get to the Point: Summarization with Pointer-Generator Networks", arXiv preprint, arXiv:1704.04368v2 [cs.CL], (Apr. 25, 2017), 20 pgs.
Sennrich, Rico, "Neural Machine Translation of Rare Words with Subword Units", arXiv preprint, arXiv:1508.07909v5 [cs.CL], (Jun. 10, 2016), 11 pgs.
Sutskever, Ilya, "Sequence to Sequence Learning with Neural Networks", Part of Advances in Neural Information Processing Systems 27 (NIPS 2014), (Dec. 14, 2014), 9 pgs.
Tu, Zhaopeng, "Modeling Coverage for Neural Machine Translation", arXiv preprint, arXiv:1601.04811v6 [cs.CL], (Aug. 6, 2016), 11 pgs.

(56) References Cited

OTHER PUBLICATIONS

Vaswani, Ashish, "Attention is All You Need", 31st Conference on Neural Information Processing Systems (NIPS), arXiv:1706.03762v5 [cs.CL], (Dec. 6, 2017), 15 pgs.

Vinyals, Oriol, "Pointer Networks", arXiv preprint, arXiv:1506.03134v2 [stat.ML], (Jan. 2, 2017), 9 pgs.

Wu, Yonghui, "Googles Neural Machine Translation System: Bridging the Gap between Human and Machine Translation", arXiv preprint, arXiv:1609.08144v2 cs.CL, (Oct. 8, 2016), 23 pgs.

Zeng, Wenyuan, "Efficient Summarization with Read-Again and Copy Mechanism", arXiv preprint, arXiv:1611.03382v1 [cs.CL], (Nov. 10, 2016), 11 pgs.

U.S. Appl. No. 18/448,675, filed Aug. 11, 2023, Tool for Annotating and Reviewing Audio Conversations.

"U.S. Appl. No. 17/303,279, Notice of Allowance dated Aug. 24, 2023", 11 pgs.

Efstathiou, "Semantic Source Code Models Using Identifier Embeddings", IEEE ACM 16th International Conference on Mining Software Repositories (MSR), (2019), 29-33.

"U.S. Appl. No. 17/305,976, Non Final Office Action dated Sep. 21, 2023", 17 pgs.

* cited by examiner

LANGUAGE MODEL FOR ABSTRACTIVE SUMMARIZATION

CLAIM OF PRIORITY

This application is a Continuation of U.S. application Ser. No. 17/304,081, filed Jun. 14, 2021, which claims priority from U.S. Provisional Patent Application No. 63/072,538, filed Aug. 31, 2020. each of which is hereby incorporated by reference in its entirety.

TECHNICAL FIELD

The subject matter disclosed herein generally relates to methods, systems, and machine-readable storage media for summarizing a text document.

BACKGROUND

Text summarization aims to produce short, coherent natural language summaries of longer-form documents while retaining important information from the original source text. Techniques for text summarization often utilize extractive and/or abstractive summarization. Extractive summarization seeks to extract grammatically valid subsets of the source document such that, when combined, the subsets produce a coherent, shorter text. Abstractive summarization, as the name suggests, aims to abstract away the direct lexical and syntactic choices of the source document and generate summary text. Neural network approaches to abstractive summarization generally encode the source document into some hidden state or representation, then decode this representation into a summarized, abstracted version of the source document.

The aforementioned approaches usually rely on a sequence-to-sequence style architecture, and tend to produce fluent, well-formed natural language summaries when coupled with beam search or other decoding techniques. A weakness of traditional sequence-to-sequence learning, when applied to summarization, is the lack of a direct copy mechanism, leading to missing or misrepresented details in decoded summaries. An attention mechanism helps ameliorate this issue by directly learning to focus on specific words or phrases in a source document. Prior techniques use an explicit copy mechanism inspired by Pointer Networks by optimizing a differentiable decision on whether to generate new text or directly copy from the source.

BRIEF DESCRIPTION OF THE DRAWINGS

Various of the appended drawings merely illustrate example embodiments of the present disclosure and cannot be considered as limiting its scope.

DETAILED DESCRIPTION

Figure 1:
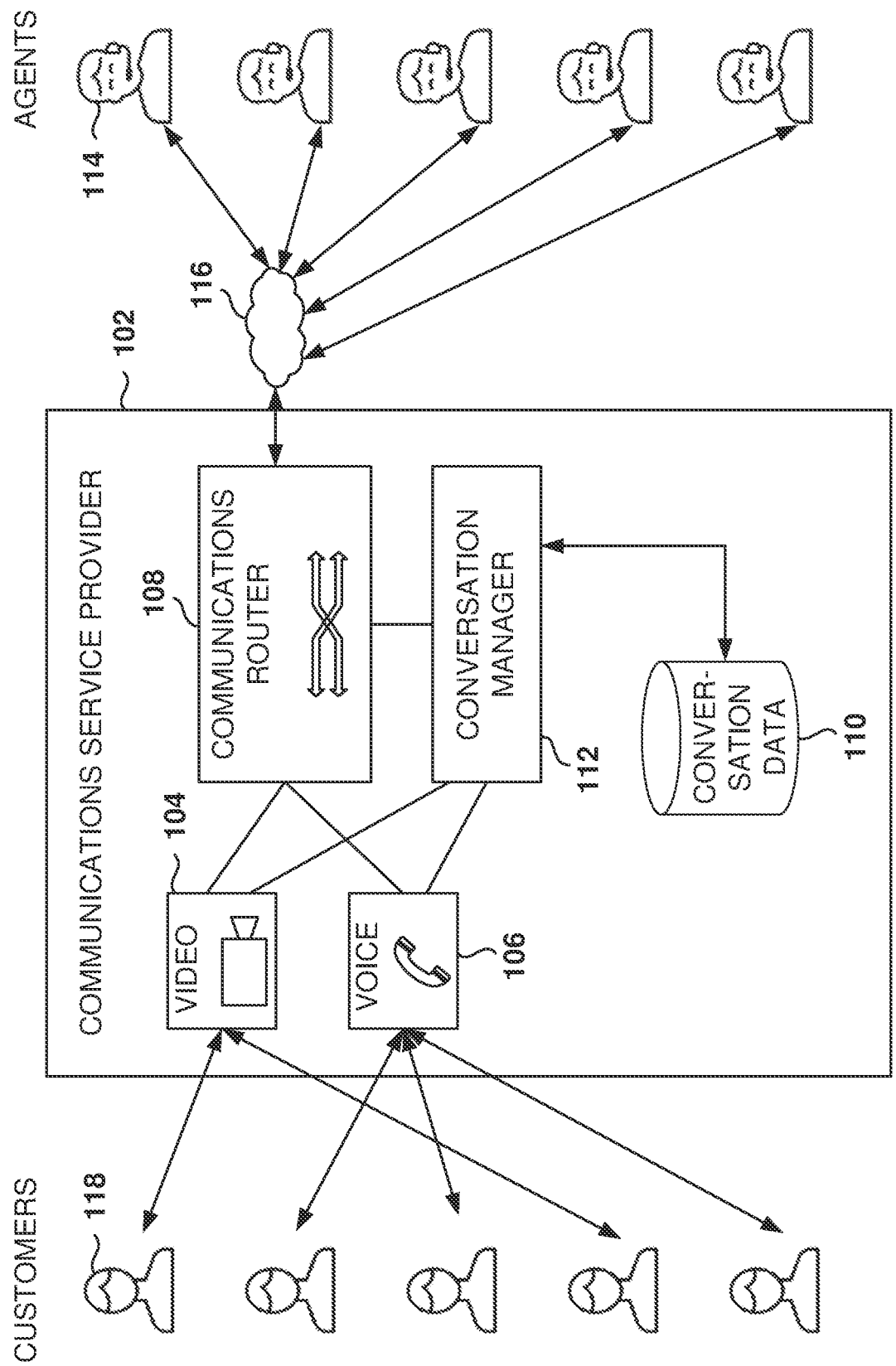
FIG. 1 is a schematic diagram showing an architecture of a communications service provider that provides call center services, according to some example embodiments.

Example methods, systems, and computer programs are directed to generating summaries of text documents, and in particularly, generating summaries for conversations. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Neural network models have shown excellent fluency and performance when applied to abstractive summarization. Many approaches to neural abstractive summarization involve the introduction of significant inductive bias, exemplified through the use of components, such as pointer-generator architectures, coverage, and partially extractive procedures, designed to mimic the process by which humans summarize documents. The presented techniques show that it is possible to attain competitive performance by directly viewing summarization as a language modeling problem and effectively leveraging transfer learning. A procedure, built upon decoder transformers, is presented to obtain highly competitive ROUGE scores for summarization performance using a language modeling loss, without utilizing other decoding-time optimization techniques e.g., beam search), instead relying on efficient nucleus sampling and greedy decoding.

Current neural-abstractive-summarization systems model semantic coverage and provide guidance on where to attend in order to directly avoid repetition and ancillary details while encouraging completeness.

Recent approaches incorporate the use of reinforcement learning to directly optimize objectives of interest that may not be differentiable, but are nonetheless useful for summarization, such as directly optimizing the ROUGE score.

Further, other techniques have shown the benefits of large-scale pretraining on large, unlabeled corpora on a variety of downstream tasks in transfer learning settings. in particular, attention-only language modeling via decoder-only transformers, as an unsupervised pre-training task, admits the ability to perform zero-shot learning on meaningful tasks involving natural language generation.

In one aspect, a method is presented that exhibits competitive performance on abstractive summarization without using sequence-to-sequence architectures or other standard tools in the neural abstractive summarization toolbox, instead using a decoder-only transformer language model with transfer learning. This further illustrates the utility of finetuning language models trained on open domain text.

Embodiments present an approach to abstractive summarization by viewing sequence transduction as a language modeling problem. The effectiveness of using decoder-only transformers for this task is proved, in particular, when coupled with large-scale language modeling and transfer learning. Further, competitive performance on two benchmark datasets is possible without many of the standard tools in neural abstractive summarization, such as sequence-to-sequence modeling, coverage mechanisms, direct ROUGE optimization via reinforcement learning, beam search, etc., instead relying on a purely language modeling loss and simple decoding mechanisms, such as nucleus sampling and greedy decoding. This approach yields highly fluent text and illustrates the power of unsupervised representation learning-based transfer learning for downstream tasks.

One general aspect includes a method that includes an operation for training a machine-learning program to create a machine-learning model that estimates a word to be added to a running summary for the text being summarized. The method further includes operations for detecting the text to be summarized, initializing the running summary, and performing a plurality of iterations. Each iteration comprises providing, to the machine-learning model, the source text and the running summary; and adding, using the machine-learning model, a new word to the running summary. The method further includes storing, on a memory, the running summary as the summary of the source text.

FIG. 1 shows an architecture of a communications service provider that provides call center services, according to some example embodiments. In some example embodiments, a communications service provider 102 provides call-center services to facilitate voice and data communications between customers 118 and agents 114.

The agents 114 may work for a plurality of companies that use the services of the communications service provider 102. The customers 118 may use the functionality of the communication service provider 102 to establish video and voice conversations to communicate with the agents 114, such as for requesting support for a product or service.

The customers 118 and agents 114 may communicate with and utilize the functionality of the communication service provider 102 through use of client devices (e.g., desktop computers, laptops, smart phones, etc.) that are connected to the communication service provider 102 via direct connections or through a network 116, such as the Internet or a private network connection. A client device is any type of general computing device capable of network communication with other computing devices. For example, a client device can be a personal computing device such as a desktop or workstation, a business server, or a portable computing device, such as a laptop, smart phone, or a tablet personal computer (PC). A client device can include some or all of the features, components, and peripherals of the machine 700 shown in FIG. 7.

Customers 118 and agents 114 may interacts with the communication service provider 102 via a client-side application installed on a client device. In some embodiments, the client-side application includes a component specific to the communication service provider 102. For example, the component may be a stand-alone application, one or more application plug-ins, and/or a browser extension. However, the customers 118 and agents 114 may also interact with the communication service provider 102 via a third-party application, such as a web browser, that resides on the client device and is configured to communicate with the communication service provider 102. In either case, the client-side application presents a user interface (UT) for the customers 118 and agents 114 to interact with the communication service provider 102. For example, the client-side application may be integrated with the file system or presented via a webpage displayed using a web browser application.

To initiate a conversation, a customer 118 or agent 114 uses a client device to initiate a request to the communication service provider 102. For example, the request may be to initiate a video or voice communication session, such as a phone call, video call, and the like. When the communication service provider 102 receives a request from a customer 118 to initiate a video or voice communication with a company, the communications service provider 102 establishes a communication session between the client device of the customer 118 and a client device of an agent 114 of the company. Similarly, when the communication service provider 102 receives a request from an agent 114 to initiate a video or voice communication with a customer 118, the communication service provider 102 establishes a communication session between the client device of the agent 114 and a client device of an customer 118.

Initiating a communication session allows for data to be transmitted back and forth between the client devices of the agent 114 and the customer 118. For example, voice and/or video data received from the client device of the agent 114 is forwarded to the client device of the customer, and vice versa. This allows the customer 118 and agent 114 to conduct a conversation, such as to discuss issues being faced by the customer 118, receive support, and the like. During the conversation, a conversation manager 112 records conversation data (e.g., voice data, video data) transmitted between the client devices of the customer 118 and agent 114 as part of the communication session and stores the conversation data in a conversations database 110 of the communications service provider 102.

Additionally, the communications service provider 102 includes a video processor 104 that processes video calls, a voice processor 106 that processes voice calls, and a communications router 108 that routes the communication data between customers 118 and agents 114.

The conversation manager 112 manages the conversations, such as to establish, monitor, and terminate conversations, as well as managing the storage of conversation data when requested by the client.

The stored conversation data may be subsequently used to manage, monitor, and improve operations, such as to monitor for compliance by an agent 114, to determine when a follow up call is requested to further a sales process, and the like.

Figure 2:
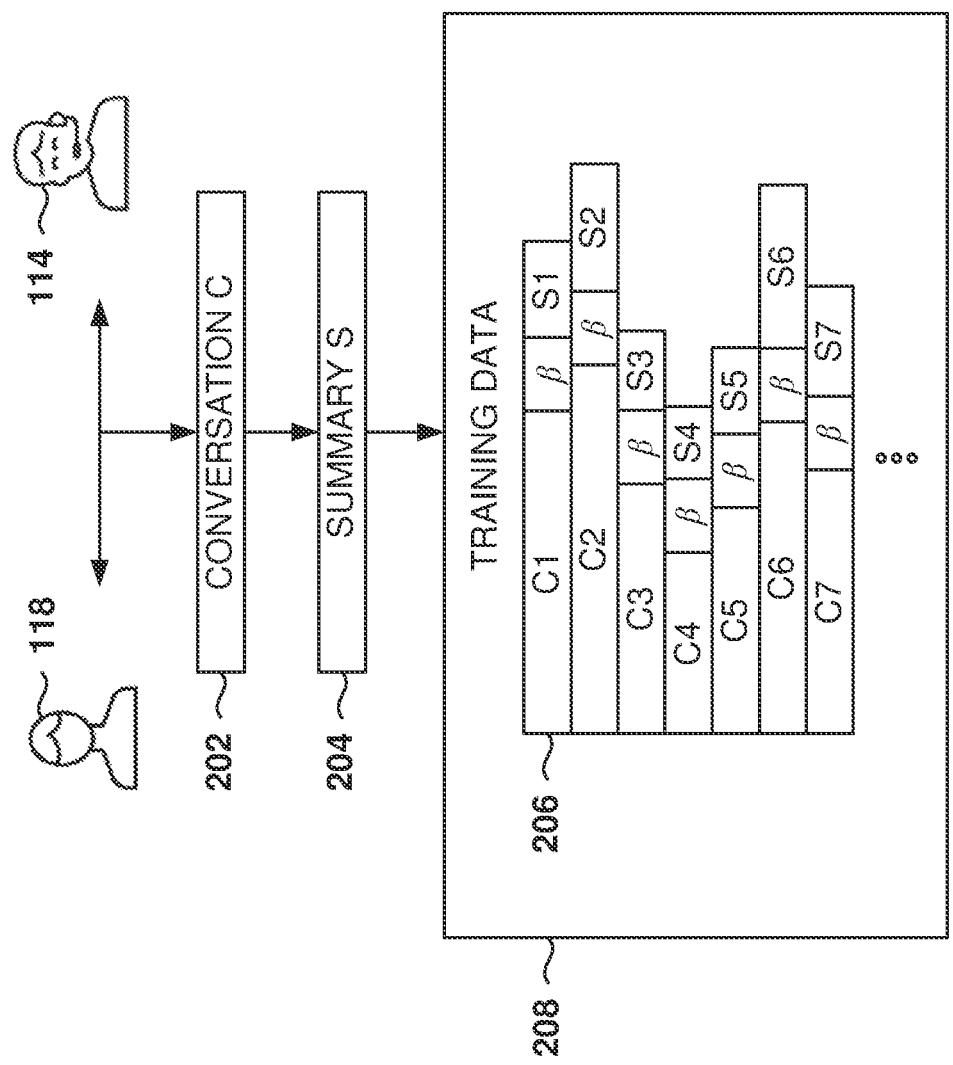
FIG. 2 is a schematic diagram illustrating the process for generating training data, according to some example embodiments.

FIG. 2 illustrates the process for generating training data, according to some example embodiments. In some example embodiments, the conversations C 202 (e.g., conversation data) are transcribed to text, and summaries S 204 of the text are created for easy access to the content of the conversation, such as by enabling searches of the content. Embodiments are presented herein for generating summaries of conversations, but the same principles may be applied to any type of text document, such as an email, a news article, a blog, a technical paper, etc.

In some example embodiments, the summaries 204 of the conversations are created by human reviewers of the conversations. In other example embodiments, the summary 204 may be created by a machine-learning (ML) summarize model. In some embodiments, the ML model is a summarize model, as described below.

In some example embodiments, training data 208 is created for training a summarize ML model, also referred to herein simply as the summarize model. The training data 208 includes a list of entries, and each entry 206 is represented by a matrix, where each row includes a vector for a word or a control token referred to as β. Thus, the rows start with the vectors of the words of the conversation 202 (e.g., C1), followed by the control token β, followed by the vectors of the words of the summary 204 (e.g., S1). The control token β acts as a marker that separates the conversation 202 from the summary 204.

The training data 208 formed by combining the conversations 202 and their respective summaries 204 is used for training the summarize model used to generate summaries for conversations inputted to the summarize model.

In some example embodiments, language models are leveraged that are trained entirely on unlabeled data. The language model can be trained to learn what English looks like, and therefore may not need labeled data.

Further, an attention language model uses a mechanism called "attention" to identify where to focus the summarization process and make predictions for the summarization. Use of attention by the language model provides a different approach than used by other summarization techniques, which employ encoder/decoder architectures. One advantage of using just the decoder for the attention language model is that the attention language model is able to be applied both for understanding what needs to be summarized and for understanding what has been thus summarized. The model components, between the summary being generated and the source text being examined, are shared at to generate the summary.

The control tokens are used to enforce what the language model learns as the summarization process progresses. The control tokens are specific tokens that guide the language model to perform a specific task. Examples of control tokens include the start of a piece of text, and the end of a piece of text. Further, a start-summary control token β indicates where the conversation ends and where the summary starts. At a high level, the summarize model takes as input this start-summary control token β, and starts summarizing after β.

Further, nucleus sampling is used to generate the summaries. Nucleus sampling generates natural language that is more natural sounding than other traditional approaches like beam search. Nucleus sampling is a method to draw quality text out of neural language models, and is based on avoiding text degeneration by truncating the unreliable tail of the probability distribution, sampling from the dynamic nucleus of tokens containing the vast majority of the probability mass. Nucleus sampling compares generations of the distribution of human text along several axes such as likelihood, diversity, and repetition.

One advantage or this approach is that the same language model that is being used to understand the source (e.g., the training data) is also used to generate the summary. This is especially useful when there are aligned domains, that is, corpus of documents that are similar, like conversations between two people in a support-center context. This means that the language that is being used in the conversation is probably very similar to what will be outputted in the summary, with similar words and similar phrases. As opposed to a problem like translation, (e.g., inputting French and outputting English), so the words of the input are unrelated to the words of the output.

Figure 3:
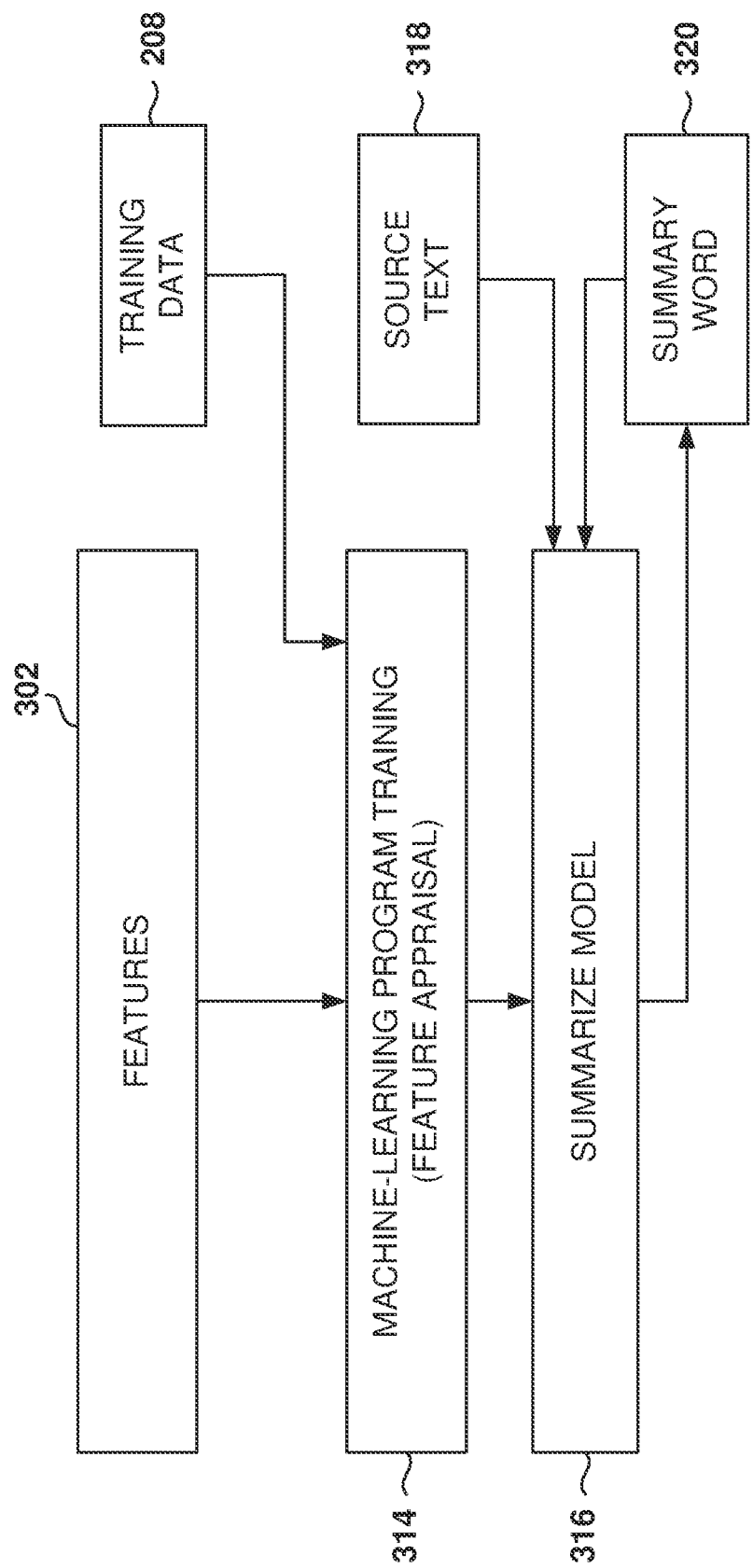
FIG. 3 is a flow diagram illustrating the training and use of a machine-learning program, according to some example embodiments.

FIG. 3 illustrates the training and use of a machine-learning program, according to some example embodiments. In some example embodiments, machine-learning programs (MLPs), also referred to as machine-learning algorithms or tools, are utilized to perform operations associated with generation of text summaries for text documents.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Such machine-learning algorithms operate by building an ML model 316 from example training data 208 in order to make data-driven predictions or decisions expressed as outputs or assessments. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Some examples of commonly used supervised-ML algorithms are Logistic Regression (LR), Naive-Bayes, Random Forest (RF), neural networks (NN), deep neural networks (DNN), matrix factorization, and Support Vector Machines (SVM). Some common tasks for unsupervised ML include clustering, representation learning, and density estimation. Some examples of commonly used unsupervised-ML algorithms are K-means clustering, principal component analysis, and autoencoders.

In some embodiments, the summarize model 316 provides the next word for inclusion in the summary, given an input conversation and the words already identified for the summary.

The training data 208 comprises examples of values for the features 302. In some example embodiments, the training data comprises labeled data with examples of values for the features 302 and labels indicating the outcome, such as summaries. The machine-learning algorithms utilize the training data 208 to find correlations among identified features 302 that affect the outcome. A feature 302 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features max be of different types, such as numeric features, strings, and graphs. In one example embodiment, the features 302 may be of different types and may include words used in the conversations.

During training 314, the ML algorithm analyzes the training data 208 based on identified features 302 defined for the training. The result of the training 314 is an ML model 316 that is capable of taking inputs to produce assessments. In some example embodiments, the inputs include a source text 318 (e.g., conversation data) and the words of the summary already generated, and the output is a new additional word to append to the current summary, referred to herein as the running summary.

Training the ML algorithm involves analyzing large amounts of data (e.g., from several gigabytes to a terabyte or more) in order to find data correlations. The ML algorithms utilize the training data 208 to find correlations among the identified features 302 that affect the outcome or assessment (e.g., summary word 320). In some example embodiments, the training data 208 includes labeled data, which is known data for one or more identified features 302 and one or more outcomes, such as the summaries generated.

The ML algorithms usually explore many possible functions and. parameters before finding what the ML algorithms identify to be the best correlations within the data; therefore, training may make use of large amounts of computing resources and time, When the summarize model 316 is used to perform an assessment, source text 318 is provided as an input to the summarize model 316, and the summarize model 316 generates the summary word 320 as output.

Many current implementations utilize an encoder/decoder system with an encoder and a decoder. in these types of systems, an encoder reads the input text (e.g., the source text), encodes that text into a vector space, and then a decoder, which is a separate model, analyzes the encoded vector to try to decode the text. Therefore, there are two separate models instead of one.

In some example embodiments, the summarize model 316 utilizes a decoder without using the encoder, which provides the technical benefit of simplifying the operation of the ML model.

Figure 4:
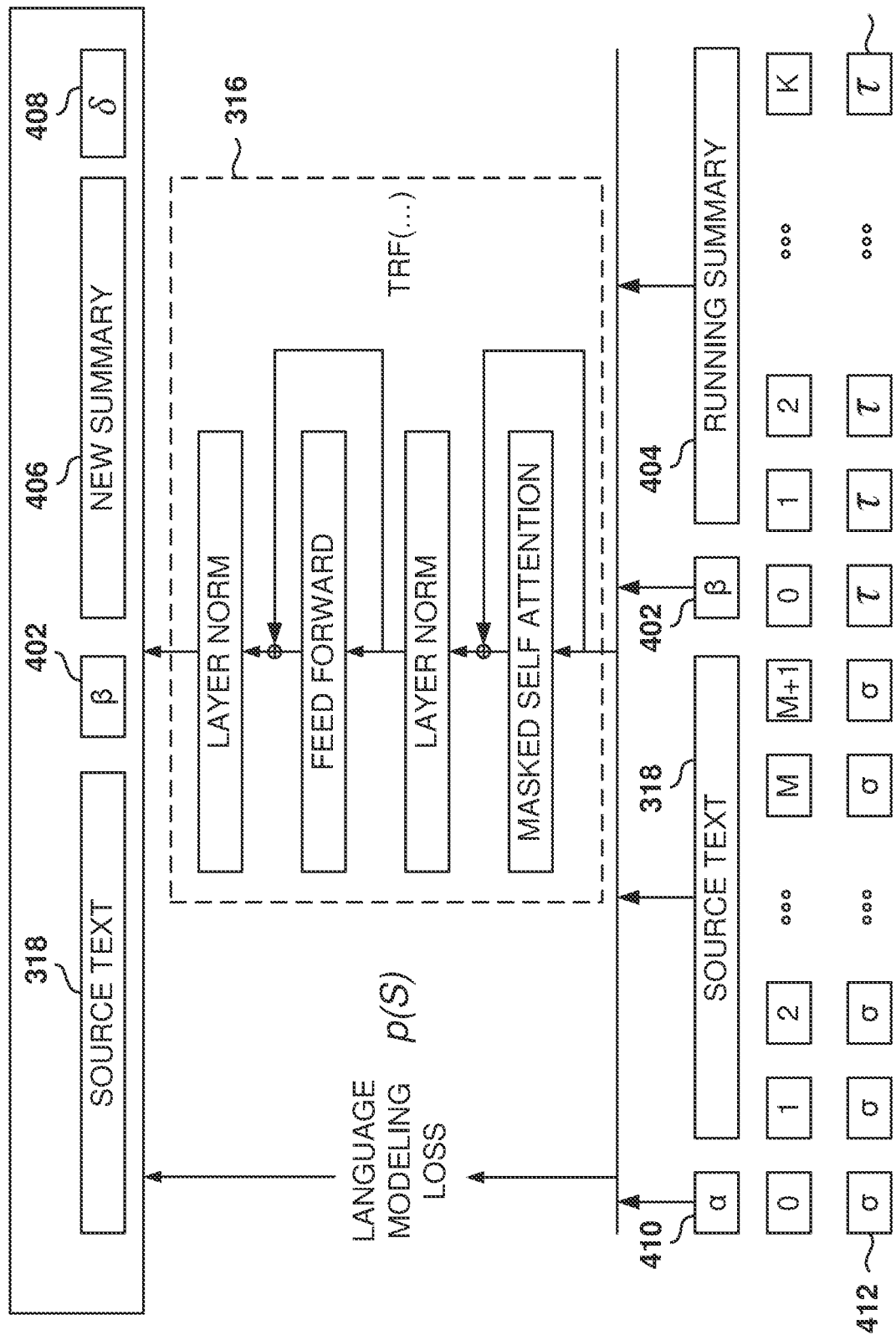
FIG. 4 is a schematic diagram showing a sample architecture for the decoder-only model for summarization, according to some example embodiments.

FIG. 4 is a sample architecture for the decoder-only model for summarization, according to some example embodiments. Transformers use an attention-based encoder-decoder type architecture. Transformers use an attention mechanism so the transformer model can "attend" or "focus" on all previous tokens that have been generated, which enables the transformers to have extremely long-term memory. At a high level, the encoder maps an input sequence into an abstract continuous representation that holds all the learned information of that input. The decoder then takes that continuous representation and step by step generates a single output while also being fed the previous output.

The encoder layers map input sequences into an abstract continuous representation that holds the learned information for that entire sequence. Embodiments presented here use a decoder-only architecture, without the need to use the encoders.

Transfer learning (U) is a machine-learning (MI) technique that focuses on storing knowledge gained while solving one problem and applying it to a different but related problem For example, knowledge gained while learning to recognize cars could apply when trying to recognize trucks. From the practical standpoint, reusing or transferring information from previously learned tasks for the learning of new tasks has the potential to significantly improve the sample efficiency of a reinforcement learning agent. In some example embodiments, transfer learning is used to be able to generate summaries of conversations based on previously created summaries. Although the conversations are different, transfer learning enables the creation of summaries for any topic, even though the topic has not been included as part of the training of the model.

FIG. 4 shows how the source text 318 (e.g., conversation), the control token β 402, and the running summary 404 already created (if any) are inputted into the summarize model 316.

In FIG. 4, α 410 indicates the start of the source text 318. During the first pass, a first word is added to the running summary 404 following the control token β, and at each pass a new word is added to the running summary 404 to generate the new summary 406, until the new summary 406 is completed. After completion, the new summary 406 is the summary for the source text 318.

In some example embodiments, such as the one illustrated in FIG. 4, the summarize model 316 is a Transformer model (TRF) with four layers. The TRY is a deep learning model used in the field of natural language processing, and like recurrent neural networks (RNNs), TRFs are designed to handle sequential data, such as natural language, for tasks such as translation and text summarization. However, unlike RNNs, TRFs do not require that the sequential data be processed in order. For example, if the input data is a natural language sentence, the TRF does not need to process the beginning of it before the end. Because of this, the TRF allows for much more parallelization than RNNs and therefore reduces training times.

The input to the summarize model 316 goes to the masked self attention layer, which indicates where to start paying attention. The layer norm is functionally normalizing the vector output of the masked self attention layer, such that what comes out of the masked self attention layer is normalized with a zero-mean unit variance, instead of having any range of number values.

The feed forward layer is a feed forward neural network used to transform the vector space, and the layer norm does another normalization of the output of the feed forward layer.

At a high level, the summarize model 316 determines what is the most likely next token (e.g., word or subword) to be added to the running summary 404. Because the summarize model 316 is trained with the control token β, the summarize model 316 is able to predict the next word that should come next in the summary.

The summarize model 316 may be tuned based on the needs of the user. For example, some users may want short summaries (one or two sentences), while other users may want to focus on the different items discussed with more flexibility to create larger summaries.

In some example embodiments, the summarize model 316 is used to summarize only a segment of the conversation. For example, the conversation is divided into multiple states, where each state is associated with a different subject and may include one or more turns during the conversation, where a turn comprises a block of text spoken by a person in the conversation without interruption from the other person in the conversation. The summarize model 316 may then be utilized to summarize each of the states separately. Of course, a summary for the complete conversation may also be identified. In some example embodiments, a turn identifier (ID) is used as an additional feature, and the turn identifiers are embedded within the conversation in order to define the turns.

The TRF model builds on previous decoder-only Transformers for jointly learning language modeling and sequence transduction in aligned domains, which limits attention to tokens 0, 1, . . . , n−1 for predicting token n. Further, a decoder-only Transformer considers a sequence of one-hot token vectors $T=[t_0, t_1, \ldots, t_{n-1}] \in \{0,1\}^{V \times n}$, with each $t_i \in \{0,1\}^V$, where V is the size of the vocabulary. Given an embedding matrix $W_E \in R^{d \times V}$ and a positional encoding matrix $W_P \in R^{d \times (n-1)}$, the model computes an initial hidden representation $H_0$ as $$H_0 = W_E T + W_P \in \mathbb{R}^{d \times (n-1)} \qquad (1)$$

Hidden representations are part of feature learning and represent the machine-readable data representations learned from a neural network's hidden layers. The output of an activated hidden node, or neuron, is used for classification or regression at the output layer, but the representation of the input data, regardless of later analysis, is called hidden representation, Another the way envision the hidden representation is that the output from the hidden layers in a neural network are just raw data, and what the machine learns to do with this data, how this data represent the features, is the hidden representation.

The words are mapped to the one-hot tokens and the token is represented as a value. Basically, a one-hot vector is a vector of size equal to the size of the vocabulary with one element being 1 and the rest being 0. Further, W includes the embeddings of the words. In some example embodiments, the embedded vector has a dimension of 768, but other values are also possible, such as in the range from 20 to 1000 or more.

The initial hidden representation $H_0$ is formed by taking all the word. vectors for all the words in a sentence and generating a matrix from these vectors. The result is a matrix of size 768 by 17 as the input, which is a matrix of the hidden representations of the words.

Further, the summarize model 316 computes each subsequent hidden representation $H_i$ as follows:

$$H_i = TRF(H_{i-1}), \forall I \in [1, \ldots L] \quad (2)$$

In equation (2), multiple hidden representations are stacked on top of each other, and the hidden representations are built through use of the transformer architecture. For example, the first hidden representation is run through the transformer, then the output is run through the transformer again, and the process is repeated multiple times (e.g., eight times). At a high level, as this process is repeated deeper and deeper through the architecture, a higher-level abstraction can be derived on top of the literal meaning of the text. Adding additional layers to the model provides for an analysis that further departs from the literal semantics, allowing for more of the figurative semantics of what is being said in the document. As the process gets deeper, there is a deeper hierarchy of understanding.

TRF is the transformer block with self-attention, and other modifications were utilized, such as Moving Layer Normalization to the beginning of each transformer block.

The final output Y is of the TRF model is the following:

$$Y_{i,n-1} = \text{softmax}(W_E^T, H_L) \in [0,1]^{V \times (n-1)} \quad (3)$$

Here, Softmax is a neural network, $Y_{i,n-1}$ is the probability assigned to the $n^{th}$ token being the $i^{th}$ word in the vocabulary given $t_0, \ldots, t_{n-1}$, and $W_E$ is shared between input and output.

After multiple layers of the hidden representations are learned, through transformer layers, the results are converted into probabilities, as the model calculates the probability of seeing the next word. The Softmax neural network takes this hidden representation and calculates the probability of seeing a particular word at a particular position in the summary, e.g., what is the probability of seeing a particular word (e.g., "rate") at position 17. This may be done for all words in the vocabulary, or for a subset of the most probable words.

The present embodiments do not use a sequence-to-sequence approach to sequence transduction, and instead construct a single longer sequence that encodes the full mapping.

Formally, a set of paired documents $C=\{(x,y)\}, |C|=N$ are considered. For a source summary pair $(x,y) \in C$, the source document $x=[x_0, \ldots, x_m]$ and reference summary $y=[y_0, \ldots, y_k]$ are sequences of one-hot token vectors, where it is assumed that m is much greater than k (m>>k). The training set C includes a set of paired documents.

To learn this mapping using a language model, x and y are combined using learnable vectors corresponding to control tokens. In addition, equation (1) is augmented to include a segment-specific (e.g., source or summary) embedding. Further, the positional encoding for the summary is reset. The model is inputted three sequences (see equation (4) below): a concatenation of the source document and the summary (S), positional encodings that reset for the summary component (P), and segment-specific encodings for the source and the summary (Q). The start of the source document is represented with α 410, the beginning of the summary with β 402, and the end of sequence with δ 408 (e.g., after the end of the new summary 406). Additionally, the source segment is encoded with a σ 412 and the summary segment with τ 414.

$$S=[\alpha,x_0, \ldots, x_m, \beta, y_0, \ldots, y_k,\delta]=[0,1, \ldots, m,m+ \\ 1, 0, 1, \ldots, k,k+1, 0]=[\sigma, \sigma, \ldots, \sigma, \\ \sigma, \tau, \ldots, \tau, \tau] \quad (4)$$

Thus, the model changes equation (1) by adding the position encoding modification from equation (4) and an additional trainable weight $W_Q$ representing the segment encoding Q, yielding equation (5) while leaving equations (2) and (3) unchanged.

$$H_0 = W_E S + W_P P + W_Q Q \quad (5)$$

Equation (5) is represented in FIG. 4. Basically, there is information that is the words, and the equation (5) accounts for the position and the segment. Whether it is source or summary, it gets included in the hidden representation.

In some example embodiments, the model is trained via maximum likelihood, where S is rewritten in equation (4) as $[t_0, t_1, \ldots, t_{m+k+2}, t_{m+k+3}]$, and equation (6) is optimized per source-summary pair, where $p(t_i|t_0, \ldots, t_{i-1})$ is obtained from Y in equation (3).

$$p(S) = \Pi_{i=1}^{m+k+3} p(t_i|t_0, \ldots, t_{i-1}) \quad (6)$$

Basically, equation (6) states that the training is for maximizing the likelihood of generating the summary given the source document.

In some example embodiments, data-driven subword encoding is used via Byte Pair Encoding (BPE) with the preirained model GPT-2. BPE is a form of data compression in which the most common pair of consecutive bytes of data is replaced with a byte that does not occur within that data, and a table of the replacements is required to rebuild the original data. For experiments in which the GPT-2 117M parameter model was finetuned, the prebuilt vocabulary was used; in ablation studies, SentencePiece (a variant of subword vocabularies) was utilized to learn BPE merges.

Figure 5:
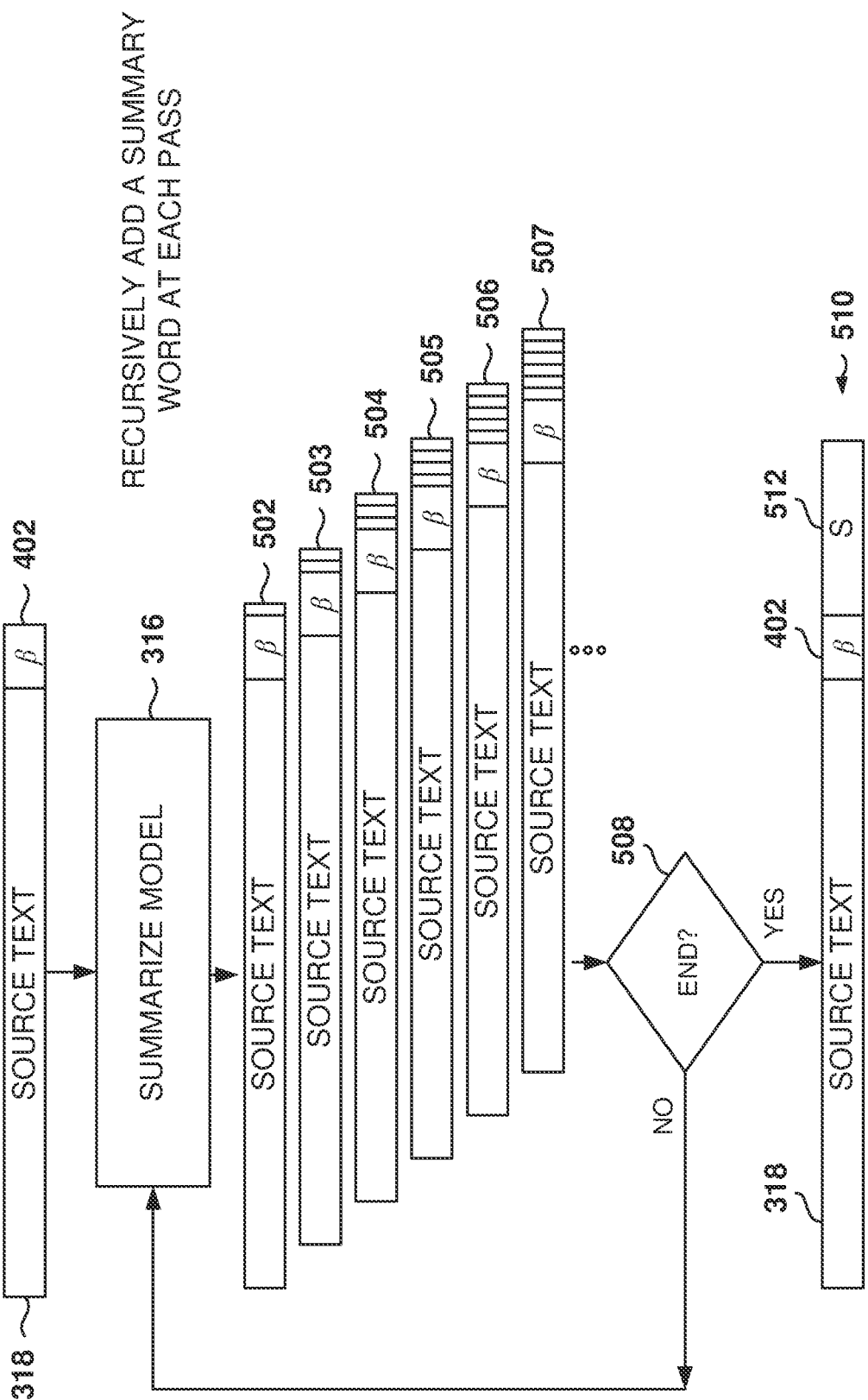
FIG. 5 is a schematic diagram illustrating the recursive process for generating the summary, according to some example embodiments.

FIG. 5 illustrates the recursive process for generating the summary 512, according to some example embodiments. During inference, a source text 318 (e.g., a conversation) is initially input to the summarize model 316, together with the control token β 402 and no summary.

The summarize model 316 generates the first word 502 and the process recursively repeats to add a word at each iteration. At the end of each iteration, a check 508 is made to determine if the end of the summary has been reached, if not, the process is repeated recursively, inputting to the summarize model 316 the source text 318, the control token β, and the words already included in the summary, e.g., to recursively add words 503, 504, 506, etc. After the last word is added, the result is summary S 512.

The performance of the summarize model 316 to create summaries was tested and compared to the performance of other summarize architectures. In the experimental setup, the models were trained and evaluated using the CNN/Daily Mail (CNN-DM) corpus of news articles and summaries, utilizing the non-anonymized version. The predefined training, validation, and test splits were used, and source articles were limited to 400 tokens and the summaries to 100 tokens at training time. As an additional test, training and evaluating of the best model configuration was used from the ablation studies above on the Extreme Summarization (XSum) corpus, which contains single sentence summaries of BBC articles. The XSum corpus makes use of models to perform a much higher degree of semantic distillation, as indicated by low n-gram overlap, high n-gram novelty, and poorly performing LEAD-3 baselines, In order to illustrate the power and simplicity of the present embodiments, the process to minimal hyperparameter tuning was limited. Experiments were conducted in two regimes for CNN-DM: first, finetuning the model outlined in Sec. 2 on top of the 117M parameter model release, and second, performing a full training from scratch in order to ablate the effect of transfer learning. A context size of 1024 was used, with an embedding dimension of 768, 12 attention heads, and a batch size of 10. The training was performed using the Adam optimizer with a learning rate of $5 \times 10^{-5}$ until the loss ceases to decrease on the validation set. Adam is an algorithm for first-order gradient-based optimization of stochastic objective functions, based on adaptive estimates of lower-order moments. For XSum, the highest-performing setup from CNN-DM experiments was used.

In lieu of beam search, which is commonly used in sequence-to-sequence and transduction models, a comparison was made of two computationally efficient approaches: greedy decoding, and nucleus sampling. In both cases, decoding was performed until reaching the stop-token $\delta$ 408 (equation (4)). in the case of nucleus sampling, five independent decodings were performed with p=0.3 (e.g., Nucleus sampling with p=0.3, which means sampling from the top 30% of the probability distribution over tokens), then picked the decoding that reported the lowest negative log likelihood score of the completed summary, formally represented in equation (7) below. It is noted that in equation (7), the index begins at i=m+2 to account for control tokens, and the fact that it is not wished to account for the likelihood of the source document in the scoring. A value of $1/k^{0.6}$ was used as a normalization term to avoid a preference for shorter summaries.

$$-\frac{1}{k^{0.6}} \sum_{i=m+2}^{m+k+3} \log(p(t_i \mid t_0, \ldots, t_m, \ldots, t_{i-1})) \quad (7)$$

The models were evaluated using the ROUGE metric, in particular the F1 variants of ROUGE-1, ROUGE-2, and ROUGE-L which measure unigram overlap, higram overlap, and longest common subsequence respectively. ROUGE (Recall-Oriented Understudy for Gisting Evaluation) is a set of metrics and a software package used for evaluating automatic summarization and machine translation software in natural language processing. The metrics compare an automatically produced summary or translation against a reference or a set of references (human-produced) summary or translation.

Table 1 below illustrates the results comparing the presented method (in the bottom two rows of the table) to existing methods (above the bottom two rows) on the CNN-DM dataset, and show ablations in Table 2.

TABLE 1

Comparison of present embodiments with existing methods on the CNN-DM dataset.

| Method | ROUGE-1 | ROUGE-2 | ROUGE-L |
| --- | --- | --- | --- |
| Pointer-Generator (See et al, 2017) | 36.44 | 15.66 | 33.42 |
| Pointer-Generator + Coverage (See et al., 2017) | 39.53 | 17.28 | 36.38 |
| ML + RL (Paulus et al., 2017) | 39.87 | 15.82 | 36.90 |
| Bottom-Up (Gehrmann et al., 2018) | 41.22 | 18.68 | 38.34 |
| DCA (best) (Celikyilmaz et al., 2018) | 41.69 | 19.47 | 37.92 |
| GPT-2 TL;DR (Radford et al., 2019) | 29.34 | 8.27 | 26.58 |
| D-TRF (Finetuned + greedy, ours) | 39.12 | 17.12 | 27.22 |
| D-TRF (Finetuned + nucleus, ours) | 40.70 | 18.03 | 29.62 |

TABLE 2

Ablation of model components on CNN-DM (Decoded via nucleus sampling procedure)

| Ablation | ROUGE-1 | ROUGE-2 | ROUGE-L |
| --- | --- | --- | --- |
| Best | 40.70 | 18.03 | 29.62 |
| (-) Finetuning | 36.10 | 15.06 | 26.92. |
| (-) Segment encoding equation (5) | 38.80 | 16.33 | 27.19 |

The new models (for ROUGE-1 and ROUGE-2) are competitive even when using greedy decoding, and without any sequence-to-sequence style architectures or coverage terms, illustrating the power of this approach for abstractive summarization. It is noted that using a well-trained language model and then finetuning yields a significant performance jump (as shown via ablation in Table 2), motivating this method in practical contexts given the recent trends toward large-scale, self-supervised learning approaches.

The new model does not perform as well on the ROUGE-L metric, which measures longest common-subsequence (LCS) between the reference summary and the decoded summary. Many experts have pointed out deficiencies in ROUGE as an evaluation metric, so an attempt was made to understand the model's deficiencies manually. To investigate, fifty random summaries that score in the bottom 5% of individual ROUGE-L scores were picked, and use manual examination for three traits (Examples are included in the Appendix): fluency, false inclusion (adding extraneous/wrong details), and exclusion (missing details from the reference). It was found that 86% (43/50) of summaries were fluent, 74% (37/50) exhibited false inclusion, and 92% (46/50) exhibited exclusion. Of those exhibiting false inclusion, 67% (31/46) also were marked as exhibiting exclusion. Though not systematic and inconclusive statistically, it is believed that this is an indication that the model suffers from "distractions," and attends to details that are not summary worthy as judged by reference summaries. This can systematically limit the highest possible ROUGE-L score the new model can achieve due to the fact that LCS makes use of interrupted matches, and skipping over a large subset of the source impairs a model's ability to perform well on a metric like ROUGE. Combining the new approach with explicitly learned masking methods may ameliorate these issues by better directing the self-attention mechanism.

As a secondary evaluation of the present embodiments, the best model on the XSum dataset was trained and reported ROUGE scores in a direct comparison to the benchmarks reported. Results for these experiments are shown in Table 3 below. The techniques achieved highly competitive performance relative to models reported for building on a finetuning approach without using many of the inductive biases traditionally present in summarization methods.

TABLE 3

Comparison of the new methods (bottom row) with existing methods on XSum, as reported in Narayan et al. (2018).

| Method | ROUGE-1 | ROUGE-2 | ROUGE-L |
| --- | --- | --- | --- |
| Seq2Seq Baseline | 28.42 | 8.77 | 22.48 |
| Conv-Seq2Seq | 31.27 | 11.07 | 25.23 |
| Topic-ConvSeq2Seq | 31.89 | 11.54 | 25.75 |
| D-TRF (Finetuned + nucleus) | 34.19 | 12.17 | 27.06 |

Further, getting a large amount of training data is time consuming, so to improve the collection of training data, summaries created by the summarized model are presented to actual operators, and the operators validated or corrected the summaries. Afterwards, the conversation and the summary may be added to the training data.

Appendix A—Examples From the Manual Analysis

Table 4 below provides examples of summaries from the bottom 5% of ROUGE-L scores on CNN-DM.

TABLE 4

| Source | Reference | Ours |
| --- | --- | --- |
| [ . . . ] mike tyson lived in a southington, ohio, mansion. [ . . . ] tyson sold the house in 1999; it's due to become, of all things, a church, the video can be seen at the top of this story [ . . . ] | here are six of cnn's best videos of theweek, clips include a look at mike tyson's abandoned mansion. | former boxer mike tyson sold his house in 1999, it's due to be converted into a church, the video can be seen at the top of this story. |
| man Chester city [ . . . ] tests have confirmed the spain international suffered no fractures after being caught in the face [ . . . ] pellegrini's men, joint top of the table on new year's day, have slumped to fourth place [ . . . ] | manchester city defeated west ham 2-0 in their premier league clash. david silva was taken to hospital after a challenge by chiekhou kouyate. spain international has allayed fans' fears with a twitter message. | david silva was injured in the second half of man city's 2-0 win against west ham, the spain international was carried off on a stretcher after eight minutes. manuel pellegrini's side were joint top of the premier league table until their current slump. |
| at least 15 fortune 500 companies, many of them worth north of a $1 billion, paid zero income taxes in 2014, says a report out last week from the citizens for tax justice. according to the report, household names like cbs, general electric and mattel all successfully manipulated the u.s. tax code to avoid paying taxes on their massive profits. [ . . . ] what's more, most of those 15 were actually given federal tax rebates in the tens or even hundreds of millions. | many of the companies named in a report out April 9 from the citizens for tax justice even received federal tax rebates, the companies include household names such as cbs, mattel, prudential and time warner. | cbs, general electric and mattel all successfully avoided paying a penny in income taxes, most of those 15 fortune 500 companies managed to get through 2014 without paying a penny in income taxes. |

Table 5 illustrates the ability of the model to copy and synthesize, for an example output from CNN-DM, including three example summaries from the new model which illustrate the ability to both copy and synthesize.

TABLE 5

| Source | Source | Source |
|---|---|---|
| arsenal, newcastle united and Southampton have checked on caen midfielder n'golo kante. paris-born kante is a defensive minded player who has impressed for caen this season and they are willing to sell for around 5 million marseille have been in constant contact with caen over signing the 24-year-old who has similarities with lassana diarra and claude makelele in terms of stature and style. n'golo kante is attracting interest from a host of premier league clubs including arsenal, caen would be willing to sell kante for around 5 million | wimbledon semi-finalist milos raonic and 19-year-old australian nick kyrgios will make their debuts at the aegon championships at queen's club this summer. Canada's raonic, ranked no 6 in the world, lost to roger federer in last year's wimbledon semi-final while kyrgios burst onto the scene with a shock fourth-round victory over two-time champion rafael nadal. the duo will join nadal, andy murray, stan wawrinka, marin cilic and defending champion grigor dimitrov at queen's, which begins on June 15. Croatia's milos raonic in action during his run to the wimbledon semi-finals last summer, nick kyrgios was responsible for the biggest upset at sw19 last year when he beat rafael nadal. | jason dufner's marriage has landed in the rough as he agreed a divorce settlement from wife amanda at the end of last month, dufner and wife amanda married in 2012 and were considered one of the golden couples of golf, but the pair separated in february and the divorce was finalised on March 31. according to the divorce settlement, filed on march 16 by amanda, there had been an 'irretrievable breakdown of the marriage' and there was 'a complete incompatibility of temperament that the parties can no longer live together.' jason dufner looks dejected as he struggles on the golf course following a neck injury last year, dufner and amanda during happier times after he won the pga championship in 2012. [ . . . ] |
| Reference | Reference | Reference |
| n'golo kante is wanted by arsenal, newcastle and Southampton, marseille are also keen on the 5 m rated midfielder. kante has been compared to lassana diarra and claude makelele. click here for the latest premier league news. | milos raonic, last year's wimbledon semi-finalist, will play at queen's club, australian nick kyrgios will also make his debut in west london. kyrgios knocked rafael nadal out of wimbledon in a huge shock last year. | jason dufner and amanda married in 2012. divorce settlement states there had been an 'irretrievable breakdown of the marriage' amanda will receive $2.5 m as part of the settlement while jason will keep two houses. |
| New model | New model | New model |
| n'golo kante is a defensive minded player who has similarities with lassana. diarra and claude makelele. paris-born kante is attracting interest from a host of premier league clubs, arsenal, newcastle and Southampton have checked on the player. | Canada's raonic and 19-yearold australian nick kyrgios will make debuts at queen's. canada's raonic lost to roger federer in last year's wi mbledon semi-final. kyrgios burst onto the scene with a shock fourthround victory over two-time champion rafael nadal. | jason dufner and wife amanda married in 2012. they were considered one of the golden couples of golf, but the pair separated in february and the divorce was finalised on March 31. |

Figure 6:
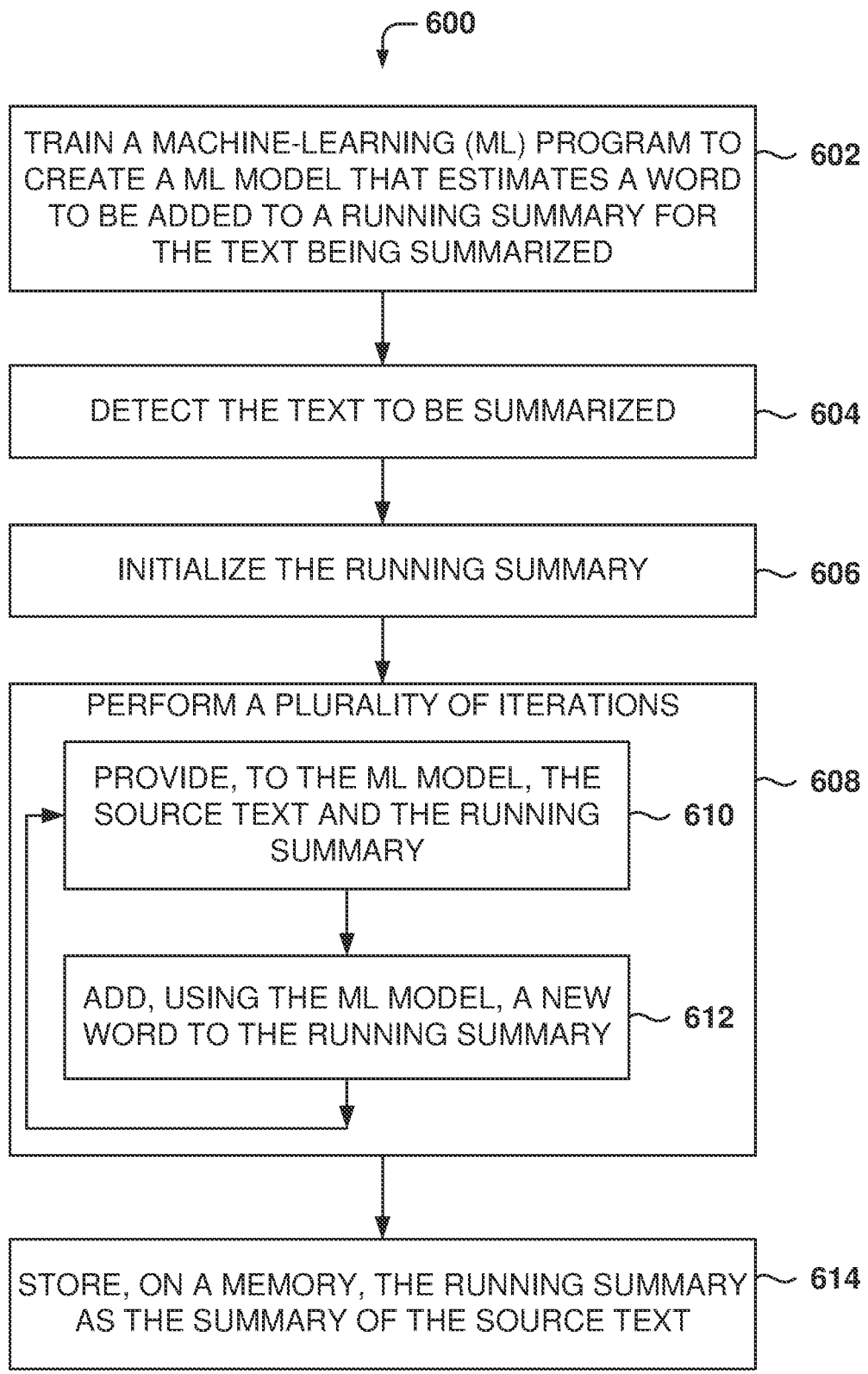
FIG. 6 is a flow chart of a method for generating a summary of a text document, according to some example embodiments.

FIG. 6 is a flowchart of a method 600 for generating a summary of a text document, according to some example embodiments. While the various operations in this flowchart are presented and described sequentially, one of ordinary skill will appreciate that some or all of the operations may be executed in a different order, be combined or omitted, or be executed in parallel.

Operation 602 is fix training a machine-learning program to create a machine-learning model that estimates a word to be added to a running summary for the text being summarized.

From operation 602, the method 600 flows to operation 604 for detecting the text to be summarized.

From operation 604, the method 600 flows to operation 606 where the running salary is initialized.

From operation 606, the method 600 flows to operation 608 for performing a plurality of iterations. Each iteration comprises operations 610 and 612.

At operation 610, the text and the running summary are provided to the machine-learning model. At operation 612, a new word is added, using the machine-learning model, to the running summary.

From operation 608, the method 600 flows to operation 614 for storing, on a memory, the running summary as the summary of the text.

In one example, the training is based on training data, the training data comprising a plurality of conversations and corresponding summaries.

In one example, the machine-learning program is trained using maximum likelihood, where the training data comprises, for each conversation from the plurality of conversations, the conversation, a control token, and the summary of the conversation, the control token separating the conversation from the summary.

In one example, the machine-learning program is a decoder-only deep-learning transformer.

In one example, the decoder-only deep-learning transformer comprises four layers comprising: a masked self attention layer, a first norm layer, a feed forward layer, and a second norm layer.

In one example, the text is embedded using data-driven subword encoding via Byte Pair Encoding (BM).

In one example, initializing the running summary comprises setting the running summary to be empty.

In one example, the text is a conversation that comprises one or more turns.

In one example, the text is a turn within a conversation.

In one example, the method 600 further comprises causing presentation of the summary on a display.

Another general aspect is for a system that includes a memory comprising instructions and one or more computer processors. The instructions, when executed by the one or more computer processors, cause the one or more computer processors to perform operations comprising: training a machine-learning program to create a machine-learning model that estimates a word to be added to a running summary for text being summarized; detecting the text to be summarized; initializing the running summary; performing a plurality of iterations, each iteration comprising: providing, to the machine-learning model, the text and the running summary; and adding, using the machine-learning model, a. new word to the running summary; and storing, on the memory, the running summary as a summary of the text.

In yet another general aspect, a machine-readable storage medium (e.g., a non-transitory storage medium) includes instructions that, when executed by a machine, cause the machine to perform operations comprising: training a machine-learning program to create a machine-learning model that estimates a word to be added to a running summary for text being summarized; detecting the text to be summarized; initializing the running summary; performing a plurality of iterations, each iteration comprising: providing, to the machine-learning model, the text and the running summary; and adding, using the machine-learning model, a new word to the running summary; and storing, on the memory, the running summary as a summary of the text.

Figure 7:
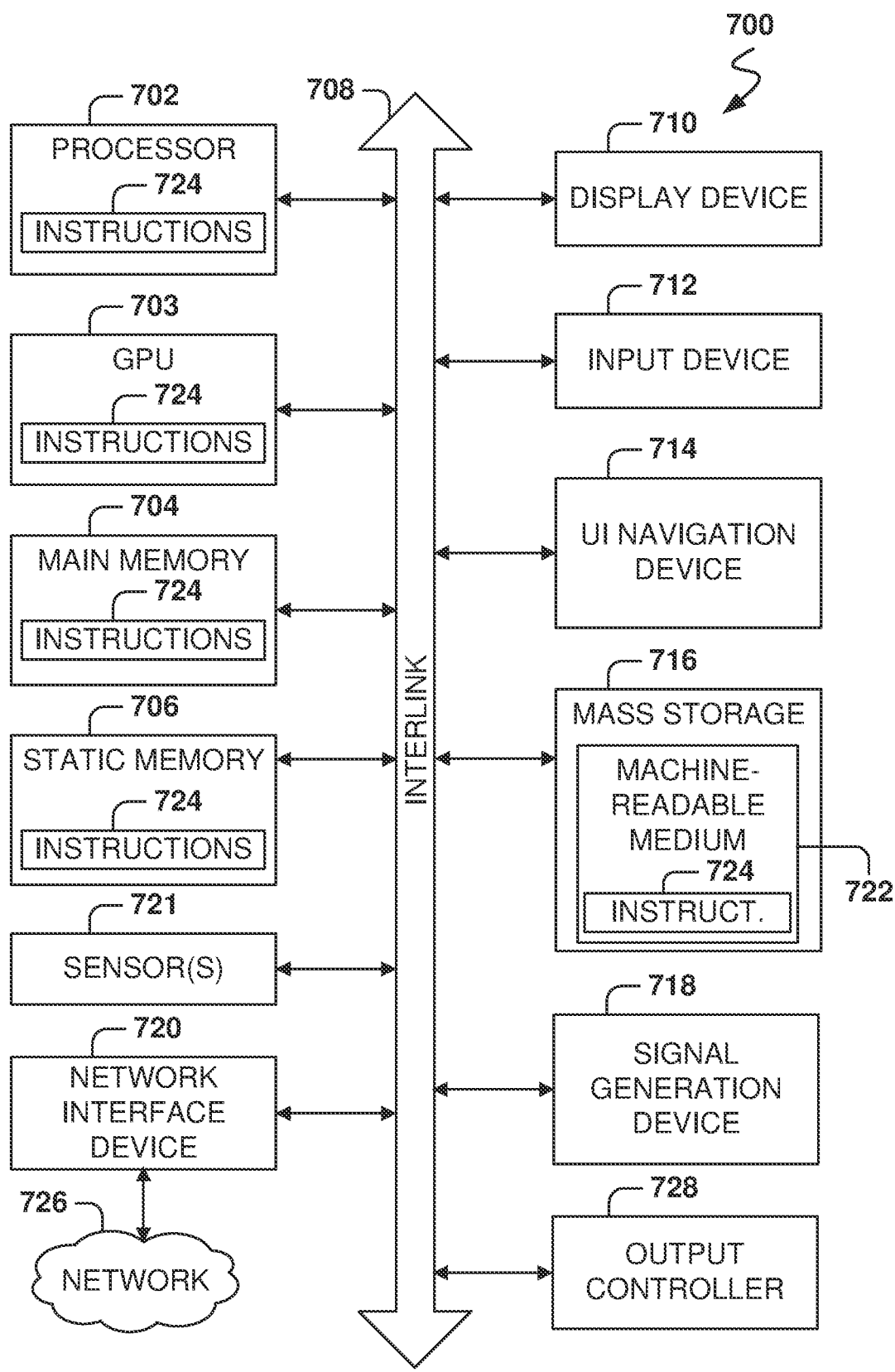
FIG. 7 is a block diagram illustrating an example of a machine upon or by which one or more example process embodiments described herein may be implemented or controlled.

FIG. 7 is a block diagram illustrating an example of a machine 700 upon or by which one or more example process embodiments described herein may be implemented or controlled. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in a peer-to-peer (P2P) (or other distributed) network environment. Further, while only a single machine 700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 700 may include a hardware processor 702 (e.g., a central processing unit (CPU), a hardware processor core, or any combination thereof), a graphics processing unit (GPU) 703, a main memory 704, and a static memory 706, some or all of which may communicate with each other via an interlink (e.g., bus) 708. The machine 700 may further include a display device 710, an alphanumeric input device 712 (e.g., a keyboard), and a user interface (UI) navigation device 714 (e.g, a mouse). In an example, the display device 710, alphanumeric input device 712, and UI navigation device 714 may be a touch screen display. The machine 700 may additionally include a mass storage device (e.g., drive unit) 716, a signal generation device 718 (e.g., a speaker), a network interface device 720, and one or more sensors 721, such as a Global Positioning System (GPS) sensor, compass, accelerometer, or another sensor. The machine 700 may include an output controller 728, such as a serial (e.g., universal serial bus (USB)), parallel, or other wired or wireless (e.g., infrared. (IR), near field communication (NFC)) connection to communicate with or control one or more peripheral devices (e.g., a printer, card reader).

The mass storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, within the hardware processor 702, or within the GPU 703 during execution thereof by the machine 700. In an example, one or any combination of the hardware processor 702, the GPU 703, the main memory 704, the static memory 706, or the mass storage device 716 may constitute machine-readable media.

While the machine-readable medium 722 is illustrated as a single medium, the term "machine-readable medium" may include a single medium, or multiple media, (e.g., a centralized or distributed database, and/or associated. caches and servers) configured to store the one or more instructions 724.

The term "machine-readable medium" may include any medium that is capable of storing, encoding, or carrying instructions 724 for execution by the machine 700 and that cause the machine 700 to perform any one or more of the techniques of the present disclosure, or that is capable of storing, encoding, or carrying data structures used by or associated with such instructions 724. Non-limiting machine-readable medium examples may include solid-state memories, and optical and magnetic media. In an example, a massed machine-readable medium comprises a machine-readable medium 722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource, Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method comprising:
accessing, by one or more processors, text to be summarized;
providing, by the one or more processors and to a trained machine-learning model, the text to be summarized and a running summary thereof, the trained machine-learning model outputting a word to be included in the running summary of the text; and
storing, by the one or more processors, the running summary including the word outputted by the trained machine-learning model.

2. The method of claim 1, further comprising:
initializing the running summary of the text.

3. The method of claim 2, wherein:
the initializing of the running summary of the text causes the initialized running summary of the text to be empty.

4. The method of claim 1, wherein:
the accessed text represents a turn among multiple turns included in a conversation.

5. The method of claim 1, further comprising:
causing presentation of at least a portion of the running summary of the text on a display.

6. The method of claim 1, wherein:
the trained machine-learning model is trained to estimate the word based on the provided text to be summarized and output the estimated word in response to provision of the text to be summarized.

7. The method of claim 1, wherein
the trained machine-learning model is trained based on a plurality of conversations and a plurality of summaries, each conversation of the plurality of conversations being summarized by a corresponding summary among the plurality of summaries.

8. A system comprising:
one or more processors; and
one or more computer-readable media storing instructions that, when executed by the one or more processors, cause the system to perform operations comprising:
accessing text to be summarized;
providing, to a trained machine-learning model, the text to be summarized and a running summary thereof, the trained machine-learning model outputting a word to be included in the running summary of the text; and
storing the running summary including the word outputted by the trained machine-learning model.

9. The system of claim 8, wherein the operations further comprise:
initializing the running summary of the text.

10. The system of claim 9, wherein:
the initializing of the running summary of the text causes the initialized running summary of the text to be empty.

11. The system of claim 8, wherein:
the accessed text represents a turn among multiple turns included in a conversation.

12. The system of claim 8, wherein the operations further comprise:

causing presentation of at least a portion of the running summary of the text on a display.

13. The system of claim 8, wherein:
the trained machine-learning model is trained to estimate the word based on the provided text to be summarized and output the estimated word in response to provision of the text to be summarized.

14. The system of claim 8, wherein
the trained machine-learning model is trained based on a plurality of conversations and a plurality of summaries, each conversation of the plurality of conversations being summarized by a corresponding summary among the plurality of summaries.

15. A non-transitory machine-readable medium storing instructions that, when executed by one or more processors of a machine, cause the machine to perform operations comprising:
accessing text to be summarized;
providing, to a trained machine-learning model, the text to be summarized and a running summary thereof, the trained machine-learning model outputting a word to be included in the running summary of the text; and
storing the running summary including the word outputted by the trained machine-learning model.

16. The non-transitory machine-readable medium of claim 15, wherein the operations further comprise:
initializing the running summary of the text.

17. The non-transitory machine-readable medium of claim 16, wherein:
the initializing of the running summary of the text causes the initialized running summary of the text to be empty.

18. The non-transitory machine-readable medium of claim 15, wherein:
the accessed text represents a turn among multiple turns included in a conversation.

19. The non-transitory machine-readable medium of claim 15, wherein the operations further comprise:
causing presentation of at least a portion of the running summary of the text on a display.

20. The non-transitory machine-readable medium of claim 15, wherein:
the trained machine-learning model is trained to estimate the word based on the provided text to be summarized and output the estimated word in response to provision of the text to be summarized.

\* \* \* \* \*